United States Patent
Shen et al.

(10) Patent No.: US 10,152,110 B2
(45) Date of Patent: Dec. 11, 2018

(54) CLOCK FREQUENCY DETERMINING METHOD AND DEVICE FOR ROUTER CARD

(71) Applicant: SOOCHOW UNIVERSITY, Suzhou, Jiangsu (CN)

(72) Inventors: Gangxiang Shen, Jiangsu (CN); Xuejiao Zhao, Jiangsu (CN); Weidong Shao, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 44 days.

(21) Appl. No.: 15/509,562

(22) PCT Filed: Oct. 27, 2015

(86) PCT No.: PCT/CN2015/092908
§ 371 (c)(1),
(2) Date: Mar. 8, 2017

(87) PCT Pub. No.: WO2016/173221
PCT Pub. Date: Nov. 3, 2016

(65) Prior Publication Data
US 2017/0285719 A1 Oct. 5, 2017

(30) Foreign Application Priority Data

Apr. 27, 2015 (CN) .......................... 2015 1 0205234

(51) Int. Cl.
*G06F 1/00* (2006.01)
*G06F 1/32* (2006.01)
*H04L 12/26* (2006.01)

(52) U.S. Cl.
CPC ................ *G06F 1/324* (2013.01); *G06F 1/00* (2013.01); *G06F 1/3287* (2013.01); *G06F 1/3296* (2013.01); *H04L 43/0817* (2013.01)

(58) Field of Classification Search
CPC ....... G06F 1/324; G06F 1/3287; G06F 1/3296
USPC .......................................................... 713/322
See application file for complete search history.

(56) References Cited

U.S. PATENT DOCUMENTS

2004/0158748 A1   8/2004   Ishibashi et al.
2014/0365810 A1   12/2014   Shih

FOREIGN PATENT DOCUMENTS

| CN | 1499342 A   | 5/2004 |
| CN | 101692647 A | 4/2010 |
| CN | 202334578 U | 7/2012 |
| CN | 104917634 A | 9/2015 |

*Primary Examiner* — Austin Hicks
(74) *Attorney, Agent, or Firm* — SZDC Law P.C.

(57) ABSTRACT

Provided are a method and a device for determining a clock frequency of a router card. The method includes steps A to D. In step A, a target average port traffic is obtained by using the number of ports and a total to-be-served traffic higher than zero of a target network node for each of neighboring network nodes. In step B, a clock frequency meeting the demand of the target average port traffic is determined as a clock frequency of any router card, the clock frequency of which has not been set, in the target network node. In step C, the total to-be-served traffic and the number of ports are updated. In step D, step A is performed, in a case that there is the updated total to-be-served traffic higher than zero.

8 Claims, 4 Drawing Sheets

" ➜ " indicates that the port is connected to the neighboring network node B
" ⇨ " indicates that the port is connected to the neighboring network node C " → " indicates that the port is connected to the neighboring network node B
" ⇨ " indicates that the port is connected to the neighboring network node C

CLOCK FREQUENCY DETERMINING METHOD AND DEVICE FOR ROUTER CARD

This application is a National Stage Application of PCT International Patent Application PCT/CN2015/092908, filed on Oct. 27, 2015, which claims priority to Chinese Patent Application No. 201510205234.4, titled "CLOCK FREQUENCY DETERMINING METHOD AND DEVICE FOR ROUTER CARD," filed with the Chinese Patent Office on Apr. 27, 2015, both of which are incorporated herein by reference in their entireties.

TECHNICAL FIELD

The present disclosure relates to the technical field of energy-saving of networks, and in particular to a method and a device for determining a clock frequency of a router card.

BACKGROUND

The increasing coverage of information and communication technology causes networks to consume more energy. Reducing energy consumption of networks has become an important research topic. The network includes multiple network nodes, and the energy consumed by a router is more than the energy consumed by any one of other components in the network node. The router mainly includes several router cards. The power consumption of a router card is proportional to a clock frequency of the router card.

The conventional technology is mainly to ensure the clock frequency of the router card to support the traffic carried by each router port on the router card, by setting the clock frequency of each router card in the network node to be the highest clock frequency supported by the router card, to ensure normal operation of the networks.

It has been found that the conventional technology can ensure the clock frequency of the router card to support the traffic carried by each router port on the router card, by setting the highest supported clock frequency for each router card, to ensure normal operation of the networks. However, since in normal operation of the networks, the actual traffic supported by the network node does not always reach the traffic supported by the highest clock frequency of each router card in the network node, it is usually caused a problem that the power consumption of networks is wasted.

SUMMARY

In view of the above, a method and a device for determining a clock frequency of a router card are provided according to the present disclosure, to avoid the problem of wasting the power consumption of networks caused by setting a highest clock frequency for each router card in the network node to ensure normal operation of the network in the conventional technology.

To achieve the above objects, technical solutions are provided according to embodiments of the present disclosure.

A method for determining a clock frequency of a router card is provided according to the present disclosure. The method includes:

step A, calculating an average port traffic of a target network node for each of neighboring network nodes by using a total to-be-served traffic and the number of ports of the target network node for each of the neighboring network nodes to obtain multiple average port traffics, selecting the highest average port traffic from the multiple the average port traffics as a target average port traffic, where the target network node is any one of network nodes in a network, and the total to-be-served traffic is higher than zero;

step B, determining a lowest clock frequency meeting a demand of the target average port traffic from preset clock frequencies based on a preset correspondence between the clock frequency and the traffic, and setting the lowest clock frequency as a clock frequency of any router card, the clock frequency of which has not been set, of a router in the target network node;

step C, updating the total to-be-served traffic and the number of ports, where a first calculating result is obtained by subtracting a service traffic of the router card, the clock frequency of which has been set, corresponding to the neighboring network node from the total to-be-served traffic of the target network node for the neighboring network node, and the first calculating result is determined as an updated total to-be-served traffic of the target network node for the neighboring network node; and a second calculating result is obtained by subtracting the number of actual ports of the router card, the clock frequency of which has been set, corresponding to the neighboring network node from the number of ports of the target network node for the neighboring network node, and the second calculating result is determined as an updated number of ports of the target network node for the neighboring network node; and step D, determining whether there is the updated total to-be-served traffic higher than zero, and performing step A in a case that there is the updated total to-be-served traffic higher than zero.

Preferably, the ports of the router in the target network node are connected to the neighboring network nodes of the target network node in an interleaving mode.

Preferably, the ports of the router in the target network node are connected to the neighboring network nodes of the target network node in a sequential mode.

Preferably, the ports of the router in the target network node are connected to the neighboring network nodes of the target network node in a mixed mode, and the mixed mode is generated based on an interleaving mode and a sequential mode in a preset proportion.

A device for determining a clock frequency of a router card is provided according to the present disclosure. The device includes:

a target average port traffic calculating unit, configured to perform step A, calculate an average port traffic of a target network node for each of neighboring network nodes by using a total to-be-served traffic and the number of ports of the target network node for each of the neighboring network nodes to obtain multiple average port traffics, select the highest average port traffic from the multiple the average port traffics as a target average port traffic, where the target network node is any one of network nodes in a network, and the total to-be-served traffic is higher than zero;

a clock frequency determining unit, configured to perform step B, determine a lowest clock frequency meeting a demand of the target average port traffic from preset clock frequencies based on a preset correspondence between the clock frequency and the traffic, and set the lowest clock frequency as a clock frequency of any router card, the clock frequency of which has not been set, of a router in the target network node;

an updating unit, configured to perform step C, update the total to-be-served traffic and the number of ports, where a first calculating result is obtained by subtracting a service traffic of the router card, the clock frequency of which has been set, corresponding to the neighboring network node from the total to-be-served traffic of the target network node for the neighboring network node, and the first calculating result is determined as an updated total to-be-served traffic of the target network node for the neighboring network node; and a second calculating result is obtained by subtracting the number of actual ports of the router card, the clock frequency of which has been set, corresponding to the neighboring network node from the number of ports of the target network node for the neighboring network node, and the second calculating result is determined as an updated number of ports of the target network node for the neighboring network node; and a determining unit, configured to perform step D, determine whether there is the updated total to-be-served traffic higher than zero, and perform to step A in a case that there is the updated total to-be-served traffic higher than zero.

Preferably, the ports of the router in the target network node are connected to the neighboring network nodes of the target network node in an interleaving mode.

Preferably, the ports of the router in the target network node are connected to the neighboring network nodes of the target network node in a sequential mode.

Preferably, the ports of the router in the target network node are connected to the neighboring network nodes of the target network node in a mixed mode, and the mixed mode is generated based on an interleaving mode and a sequential mode in a preset proportion.

A method and a device for determining a clock frequency of a router card are provided according to the present disclosure. In step A, the target average port traffic is obtained by using the number of ports and the total to-be-served traffic higher than zero of the target network node for each of the neighboring network nodes. In step B, the clock frequency meeting the demand of the target average port traffic is determined as the clock frequency of any router card, the clock frequency of which has not been set, in the target network node. In step C, the total to-be-served traffic and the number of ports are updated. In step D, step A is performed, in a case that there is the updated total to-be-served traffic higher than zero. By performing step A to step D according to the present disclosure, the object is achieved that a clock frequency of a router card in the target network node is determined based on the total to-be-served traffic and the number of ports of the current target network node for each of the neighboring network nodes, which avoids the problem of wasting the power consumption of networks caused by setting the highest clock frequency for each router card in a network node to ensure normal operation of the networks in the conventional technology.

BRIEF DESCRIPTION OF THE DRAWINGS

To illustrate technical solutions according to embodiments of the present disclosure or in the conventional technologies more clearly, drawings to be used in the descriptions of the embodiments or the conventional technologies are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

Technical solutions of the embodiments of the present disclosure are illustrated clearly and completely in conjunction with the drawings of the embodiments of the present disclosure. Apparently, the described embodiments are merely a few rather than all of the embodiments of the present disclosure. All other embodiments obtained by those skilled in the art based on the embodiments of the present disclosure without creative efforts shall fall within the protection scope of the present disclosure.

A First Embodiment

Figure 1:
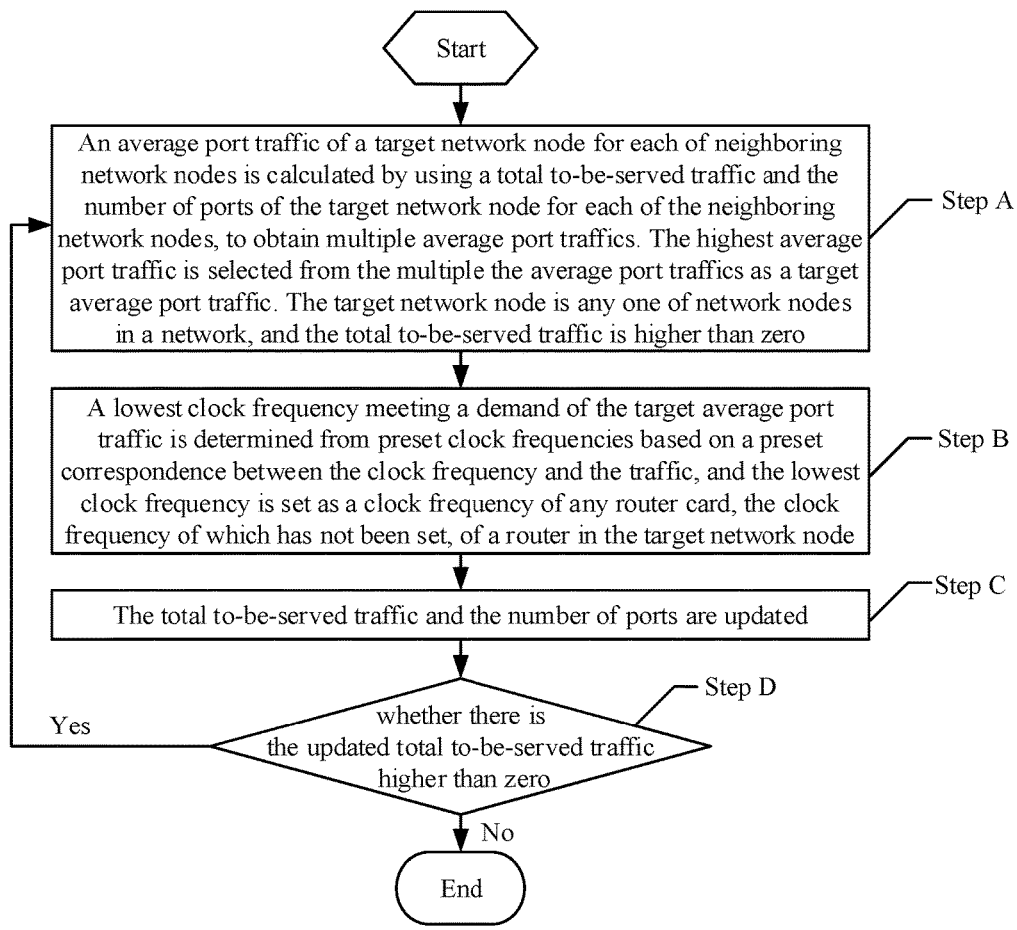
FIG. 1 is a flow chart of a method for determining a clock frequency of a router card according to a first embodiment of the present disclosure.

FIG. 1 is a flow chart of a method for determining a clock frequency of a router card according to the first embodiment of the present disclosure. As shown in FIG. 1, the method includes steps A to D.

In step A, an average port traffic of a target network node for each of neighboring network nodes is calculated by using a total to-be-served traffic and the number of ports of the target network node for each of the neighboring network nodes, to obtain multiple average port traffics. The highest average port traffic is selected from the multiple the average port traffics as a target average port traffic. The target network node is any one of network nodes in a network, and the total to-be-served traffic is higher than zero.

In the embodiment of the present disclosure, preferably, the network includes several network nodes. For each of the network nodes in the network, there may be several network nodes neighboring to it. The network nodes neighboring to a network node are referred to as neighboring network nodes of the network node.

In the embodiment of the present disclosure, preferably, any one of the network nodes in the network is determined as the target network node to execute the method for determining a clock frequency of a router card according to the embodiment of the present disclosure.

The above embodiment is only a preferred embodiment according to the present disclosure. Those skilled in the art can set an executing range of the method for determining a clock frequency of a router card according to the embodiment of the present disclosure based on demands, for example, applying the method to all the network nodes in the network, i.e., respectively determining each of all the network nodes in the network as the target network node, which is not limited herein.

In the embodiment of the present disclosure, preferably, the target network node is determined firstly, and the average port traffic of the target network node for each of the neighboring network nodes is calculated by using the total to-be-served traffic and the number of ports of the target network node for each of the neighboring network nodes. The total to-be-served traffic is higher than zero. For example, the target network node is determined for further determining the neighboring network node, the total to-be-served traffic of the target network node for which is higher than zero. Further, the average port traffic of the target network node for each of the neighboring network nodes, the total to-be-served traffic of the target network node for which is higher than zero, is calculated. That is, the total to-be-served traffic of the target network node for the neighboring network node is divided by the number of ports of the target network node for the neighboring network node (the total to-be-served traffic are divided by the number of ports), and the obtained result of the dividing is determined as the average port traffic of the target network node for the neighboring network node.

In step B, a lowest clock frequency meeting a demand of the target average port traffic is determined from preset clock frequencies based on a preset correspondence between the clock frequency and the traffic, and the lowest clock frequency is set as a clock frequency of any router card, the clock frequency of which has not been set, of a router in the target network node.

In the embodiment of the present disclosure, several clock frequencies are preset, and the correspondence between the clock frequency and the traffic is preset. After the target average port traffic is determined, the clock frequency meeting the demand of the target average port traffic (the clock frequency is the lowest clock frequency meeting the demand of the target average port traffic of the several preset clock frequencies) is determined with reference to the preset correspondence between the clock frequency and the traffic. The lowest clock frequency is set as the clock frequency of any router card, the clock frequency of which has not been set, of a router in the target network node.

In step C, the total to-be-served traffic and the number of ports are updated.

In the embodiment of the present disclosure, preferably, a first calculating result is obtained by subtracting a service traffic of the router card, the clock frequency of which has been set, corresponding to the neighboring network node from the total to-be-served traffic of the target network node for the neighboring network node, and the first calculating result is determined as an updated total to-be-served traffic of the target network node for the neighboring network node.

In the embodiment of the present disclosure, preferably, a second calculating result is obtained by subtracting the number of actual ports of the router card, the clock frequency of which has been set, corresponding to the neighboring network node from the number of ports of the target network node for the neighboring network node, and the second calculating result is determined as an updated number of ports of the target network node for the neighboring network node.

In step D, it is determined whether there is the updated total to-be-served traffic higher than zero, and step A is performed in a case that there is the updated total to-be-served traffic higher than zero.

A method and a device for determining a clock frequency of a router card are provided according to the present disclosure. In step A, the target average port traffic is obtained by using the number of ports and the total to-be-served traffic higher than zero of the target network node for each of the neighboring network nodes. In step B, the clock frequency meeting the demand of the target average port traffic is determined as the clock frequency of any router card, the clock frequency of which has not been set, in the target network node. In step C, the total to-be-served traffic and the number of ports are updated. In step D, step A is performed, in a case that there is the updated total to-be-served traffic higher than zero. By performing step A to step D according to the present disclosure, the object is achieved that a clock frequency of a router card in the target network node is determined based on the total to-be-served traffic and the number of ports of the current target network node for each of the neighboring network nodes, which avoids the problem of wasting the power consumption of networks caused by setting the highest clock frequency for each router card in a network node to ensure normal operation of the networks in the conventional technology.

In the embodiment of the present disclosure, preferably, the ports of the router in the target network node are connected to the neighboring network nodes of the target network node in an interleaving mode.

Figure 2:
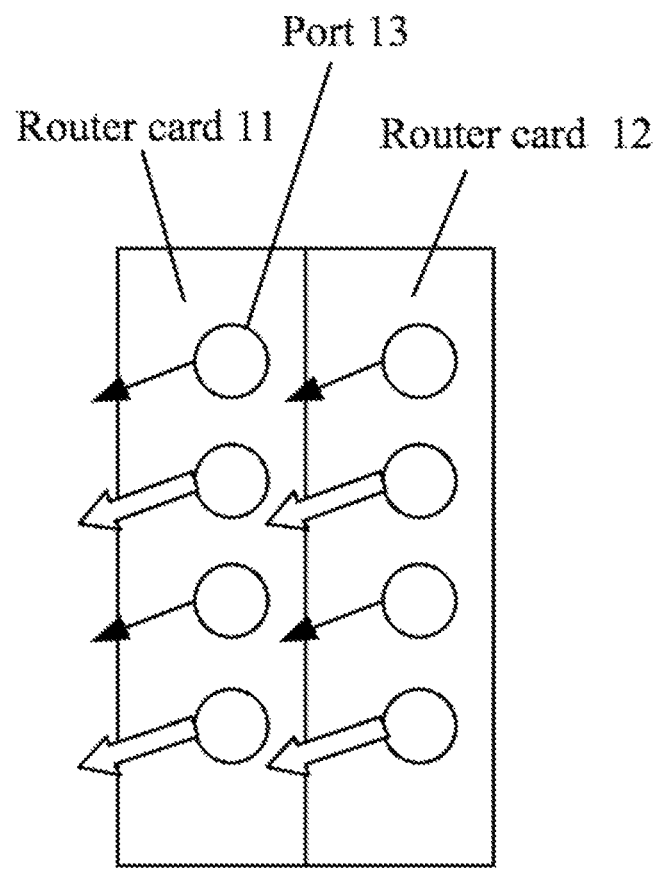
FIG. 2 is a schematic diagram of a connection relation between ports of a router in a target network node and neighboring network nodes of the target network node according to a first embodiment of the present disclosure.

FIG. 2 is a schematic diagram of a connection relation between ports of a router in a target network node and neighboring network nodes of the target network node according to a first embodiment of the present disclosure.

As shown in FIG. 2, the router in the target network node is provided with two router cards, which are a router card 11 and a router card 12. The router card 11 and the router card 12 are provided with four ports 13, respectively.

It is assumed that the target network node has two neighboring network nodes, which are a neighboring network node B and a neighboring network node C. The connection relation between the ports of the router in the target network node and the neighboring network node B and the neighboring network node C in the interleaving mode refers to FIG. 2. "→" indicates that the port is connected to the neighboring network node B, and "⇒" indicates that the port is connected to the neighboring network node C.

It can be seen that the interleaving mode refers to that the ports of the router in the target network node are connected to all the neighboring network nodes in a polling manner. For example, a part of the ports of the router in the target network node are connected to all the neighboring network nodes in sequence, and another part of the ports of the router in the target network node are connected to all the neighboring network nodes in the same sequence, until all the ports of the router in the target network node are connected.

In the embodiment of the present disclosure, preferably, the ports of the router in the target network node are connected to the neighboring network nodes of the target network node in a sequential mode.

Figure 3:
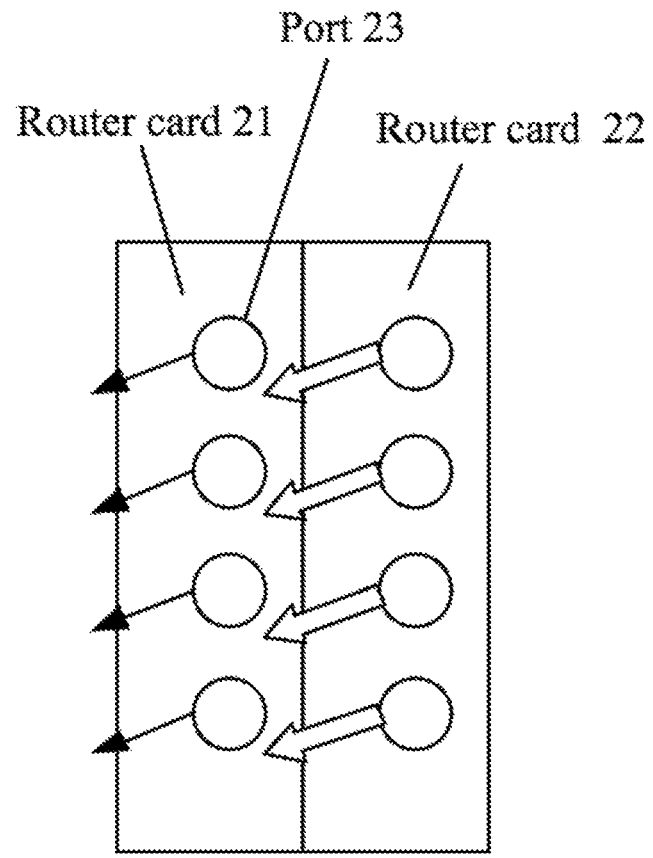
FIG. 3 is a schematic diagram of another connection relation between ports of a router in a target network node and neighboring network nodes of the target network node according to a first embodiment of the present disclosure.

FIG. 3 is a schematic diagram of another connection relation between ports of a router in a target network node and neighboring network nodes of the target network node according to a first embodiment of the present disclosure.

As shown in FIG. 3, the router in the target network node is provided with two router cards, which are a router card 21 and a router card 22. The router card 21 and the router card 22 are provided with four ports 23, respectively.

It is assumed that the target network node has two neighboring network nodes, which are a neighboring network node B and a neighboring network node C. The connection relation between the ports of the router in the target network node and the neighboring network node B and the neighboring network node C in the sequential mode refers to FIG. 3. "→" indicates that the port is connected to the neighboring network node B, and "⇒" indicates that the port is connected to the neighboring network node C.

It can be seen that the sequential mode refers to that the ports of the router in the target network node are connected to each of the neighboring network nodes in sequence. For example, the first neighboring network node is connected to the ports required by the first neighboring network node, and the second neighboring network node is connected to the ports required by the second neighboring network node, until each of the neighboring network nodes is connected to the ports required by the neighboring network node.

In the embodiment of the present disclosure, preferably, the ports of the router in the target network node are connected to the neighboring network nodes of the target network node in a mixed mode, and the mixed mode is generated based on the interleaving mode and the sequential mode in a preset proportion.

Specifically, those skilled in the art can set the proportion between the interleaving mode and the sequential mode in the mixed mode according to demands, which is not limited herein.

Furthermore, in the method for determining a clock frequency of a router card according to the embodiment of the present disclosure, after the clock frequency of any router card, the clock frequency of which has not been set, of the router in the target network node is determined, a voltage of the router card can be set as a lowest voltage of multiple preset voltages meeting a voltage demand of the clock frequency of the router card.

In the embodiment of the present disclosure, preferably, after the clock frequency of the router card is determined, the setting the lowest voltage meeting the clock frequency may further reduce the power consumption of the router card.

Based on further description of the method for determining a clock frequency of a router card according to the embodiment of the present disclosure, the method for determining a clock frequency of a router card according to the embodiment of the present disclosure is more clear, complete, and easy to understand for those skilled in the art.

A Second Embodiment

Figure 4:
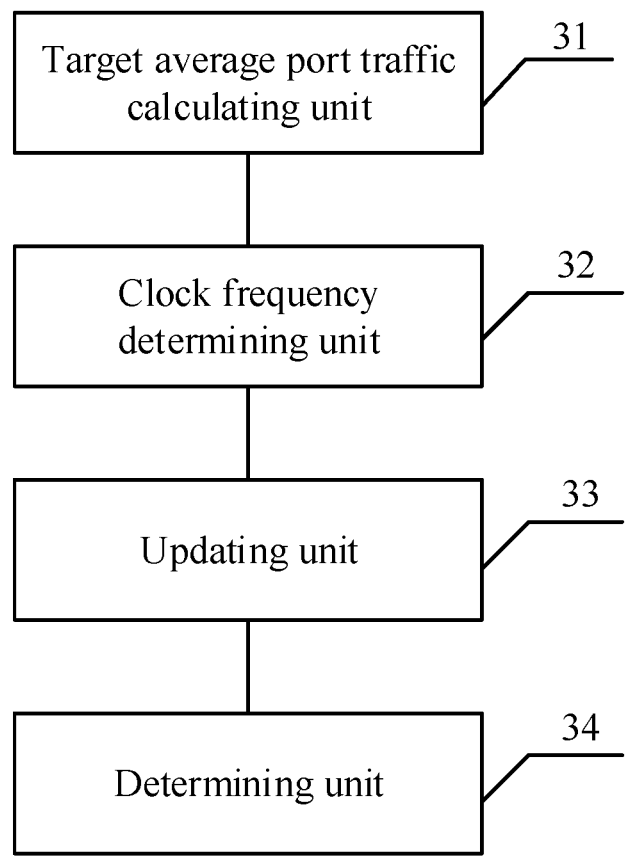
FIG. 4 is a schematic structural diagram of a device for determining a clock frequency of a router card according to a second embodiment of the present disclosure.

FIG. 4 is a schematic structural diagram of a device for determining a clock frequency of a router card according to a second embodiment of the present disclosure. As shown in FIG. 4, the device includes a target average port traffic calculating unit 31, a clock frequency determining unit 32, an updating unit 33 and a determining unit 34.

The target average port traffic calculating unit 31 is configured to perform step A, calculate an average port traffic of a target network node for each of neighboring network nodes by using a total to-be-served traffic and the number of ports of the target network node for each of the neighboring network nodes to obtain multiple average port traffics, select the highest average port traffic from the multiple the average port traffics as a target average port traffic. The target network node is any one of network nodes in a network, and the total to-be-served traffic is higher than zero.

The clock frequency determining unit 32 is configured to perform step B, determine a lowest clock frequency meeting a demand of the target average port traffic from preset clock frequencies based on a preset correspondence between the clock frequency and the traffic, and set the lowest clock frequency as a clock frequency of any router card, the clock frequency of which has not been set, of a router in the target network node.

The updating unit 33 is configured to perform step C, update the total to-be-served traffic and the number of ports. A first calculating result is obtained by subtracting a service traffic of the router card, the clock frequency of which has been set, corresponding to the neighboring network node from the total to-be-served traffic of the target network node for the neighboring network node, and the first calculating result is determined as an updated total to-be-served traffic of the target network node for the neighboring network node. A second calculating result is obtained by subtracting the number of actual ports of the router card, the clock frequency of which has been set, corresponding to the neighboring network node from the number of ports of the target network node for the neighboring network node, and the second calculating result is determined as an updated number of ports of the target network node for the neighboring network node.

The determining unit 34 is configured to perform step D, determine whether there is the updated total to-be-served traffic higher than zero, and perform step A in a case that there is the updated total to-be-served traffic higher than zero.

In the embodiment of the present disclosure, preferably, the ports of the router in the target network node are connected to the neighboring network nodes of the target network node in an interleaving mode.

In the embodiment of the present disclosure, preferably, the ports of the router in the target network node are connected to the neighboring network nodes of the target network node in a sequential mode.

In the embodiment of the present disclosure, preferably, the ports of the router in the target network node are connected to the neighboring network nodes of the target network node in a mixed mode, and the mixed mode is generated based on the interleaving mode and the sequential mode in a preset proportion.

A device for determining a clock frequency of a router card is provided according to the present disclosure. In step A, the target average port traffic is obtained by using the number of ports and the total to-be-served traffic higher than zero of the target network node for each of the neighboring network nodes. In step B, the clock frequency meeting the demand of the target average port traffic is determined as the clock frequency of any router card, the clock frequency of which has not been set, in the target network node. In step C, the total to-be-served traffic and the number of ports are updated. In step D, step A is performed, in a case that there is the updated total to-be-served traffic higher than zero. By performing step A to step D according to the present disclosure, the object is achieved that a clock frequency of a router card in the target network node is determined based on the total to-be-served traffic and the number of ports of the current target network node for each of the neighboring network nodes, which avoids the problem of wasting the power consumption of networks caused by setting the highest clock frequency for each router card in a network node to ensure normal operation of the networks in the conventional technology.

Various embodiments in the specification are described in a progressive manner, the differences from other embodiments are emphatically illustrated in each embodiment, and reference can be made to other embodiments for understanding the same or similar parts of the embodiments. Since the device disclosed by the embodiments corresponds to the method disclosed by the embodiments, the device is described briefly and reference is made to the descriptions in the method for related parts.

The above embodiments are only preferred embodiments of the present disclosure to make those skilled in the art understand or implement present disclosure. Various modifications made to these embodiments may be obvious for those skilled in the art, and a normal principle defined in the present disclosure may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for determining a clock frequency of a router card, comprising:
   step A, calculating an average port traffic of a target network node for each of neighboring network nodes by using a total to-be-served traffic and a number of ports of the target network node for each of the neighboring network nodes to obtain a plurality of average port traffics, selecting a highest average port traffic from the plurality of average port traffics as a target average port traffic, wherein the target network node is any one of network nodes in a network, and the total to-be-served traffic is higher than zero;
   step B, determining a lowest clock frequency meeting a demand of the target average port traffic from preset clock frequencies based on a preset correspondence between a clock frequency and a traffic, and setting the lowest clock frequency as a clock frequency of any router card, the clock frequency of which has not been set, of a router in the target network node;
   step C, updating the total to-be-served traffic and the number of ports, wherein a first calculating result is obtained by subtracting a service traffic of the router card, the clock frequency of which has been set, corresponding to the neighboring network node from the total to-be-served traffic of the target network node for the neighboring network node, and the first calculating result is determined as an updated total to-be-served traffic of the target network node for the neighboring network node; and a second calculating result is obtained by subtracting a number of actual ports of the router card, the clock frequency of which has been set, corresponding to the neighboring network node from the number of ports of the target network node for the neighboring network node, and the second calculating result is determined as an updated number of ports of the target network node for the neighboring network node; and
   step D, determining whether there is the updated total to-be-served traffic higher than zero, and performing step A in a case that there is the updated total to-be-served traffic higher than zero.

2. The method according to claim 1, wherein ports of the router in the target network node are connected to the neighboring network nodes of the target network node in an interleaving mode.

3. The method according to claim 1, wherein ports of the router in the target network node are connected to the neighboring network nodes of the target network node in a sequential mode.

4. The method according to claim 1, wherein ports of the router in the target network node are connected to the neighboring network nodes of the target network node in a mixed mode, and the mixed mode is generated based on an interleaving mode and a sequential mode in a preset proportion.

5. A device for determining a clock frequency of a router card, comprising:
   a target average port traffic calculating unit, configured to perform step A, calculate an average port traffic of a target network node for each of neighboring network nodes by using a total to-be-served traffic and a number of ports of the target network node for each of the neighboring network nodes to obtain a plurality of average port traffics, select a highest average port traffic from the plurality of average port traffics as a target average port traffic, wherein the target network node is any one of network nodes in a network, and the total to-be-served traffic is higher than zero;
   a clock frequency determining unit, configured to perform step B, determine a lowest clock frequency meeting a demand of the target average port traffic from preset clock frequencies based on a preset correspondence between a clock frequency and a traffic, and set the lowest clock frequency as a clock frequency of any router card, the clock frequency of which has not been set, of a router in the target network node;
   an updating unit, configured to perform step C, update the total to-be-served traffic and the number of ports, wherein a first calculating result is obtained by subtracting a service traffic of the router card, the clock frequency of which has been set, corresponding to the neighboring network node from the total to-be-served traffic of the target network node for the neighboring network node, and the first calculating result is determined as an updated total to-be-served traffic of the target network node for the neighboring network node; and a second calculating result is obtained by subtracting a number of actual ports of the router card, the clock frequency of which has been set, corresponding to the neighboring network node from the number of ports of the target network node for the neighboring network node, and the second calculating result is determined as an updated number of ports of the target network node for the neighboring network node; and
   a determining unit, configured to perform step D, determine whether there is the updated total to-be-served traffic higher than zero, and perform step A in a case that there is the updated total to-be-served traffic higher than zero.

6. The device according to claim 5, wherein ports of the router in the target network node are connected to the neighboring network nodes of the target network node in an interleaving mode.

7. The device according to claim 5, wherein ports of the router in the target network node are connected to the neighboring network nodes of the target network node in a sequential mode.

8. The device according to claim 5, wherein ports of the router in the target network node are connected to the neighboring network nodes of the target network node in a mixed mode, and the mixed mode is generated based on an interleaving mode and a sequential mode in a preset proportion.

* * * * *